United States Patent [19]

Berg et al.

[11] Patent Number: 4,873,314

[45] Date of Patent: Oct. 10, 1989

[54] PROCESS FOR THE PRODUCTION OF POLYCARBONATE SOLUTIONS

[75] Inventors: Klaus Berg; Karsten-Josef Idel, both of Krefeld; Ulrich Grigo, Kempen, all of Fed. Rep. of Germany

[73] Assignee: Bayer Aktiengesellschaft, Leverkusen, Fed. Rep. of Germany

[21] Appl. No.: 157,438

[22] Filed: Feb. 18, 1988

[30] Foreign Application Priority Data

Feb. 26, 1987 [DE] Fed. Rep. of Germany ....... 3706205

[51] Int. Cl.$^4$ ..................... C08G 63/74; C08G 63/62
[52] U.S. Cl. ..................................... 528/487; 528/198
[58] Field of Search ................................ 528/198, 487

[56] References Cited

U.S. PATENT DOCUMENTS

| | | | |
|---|---|---|---|
| 3,028,365 | 4/1962 | Schnell et al. | 260/47 |
| 3,275,601 | 9/1966 | Schnell et al. | 260/47 |
| 3,305,520 | 2/1967 | Fritz et al. | 260/45.7 |
| 3,322,719 | 5/1967 | Peilstocker | 260/45.8 |
| 3,404,122 | 10/1968 | Fritz et al. | 260/45.7 |
| 3,492,268 | 1/1970 | Baker | 528/487 |
| 3,943,101 | 3/1976 | Vestergaard et al. | 260/45.85 |

FOREIGN PATENT DOCUMENTS

| | | | |
|---|---|---|---|
| 1469094 | 1/1969 | Fed. Rep. of Germany . | |
| 36-3596 | 4/1961 | Japan . | |
| 37-13775 | 9/1962 | Japan . | |
| 61-14227 | 1/1986 | Japan | 528/198 |
| 456142 | 8/1961 | Switzerland . | |
| 1372114 | 10/1974 | United Kingdom . | |

*Primary Examiner*—C. Warren Ivy
*Attorney, Agent, or Firm*—Gene Harsh; Joseph C. Gil; Aron Preis

[57] ABSTRACT

The invention relates to a process for the production of solutions of polycarbonates in organic inert solvents which is characterized in that from 2.5 ppm to 100 ppm phosphorous acid, based on the weight of the diphenol used for polycarbonate production, are added to the emulsion of the two phases obtainable by the known two-phase interfacial process and the emulsion is worked up in known manner.

2 Claims, No Drawings

PROCESS FOR THE PRODUCTION OF POLYCARBONATE SOLUTIONS

This invention relates to a process for the production of solutions of polycarbonates in organic, inert solvents which is characterized in that from 2.5 ppm to 100 ppm and preferably from 5 ppm to 10 ppm phosphorous acid, based on the weight of the diphenol used for polycarbonate production, are added to the emulsion of the two phases obtainable by the known two-phase interfacial process and the emulsion is worked up in known manner.

The polycarbonates isolatable from the polycarbonate solutions obtainable in accordance with the invention have a greatly reduced iron content which is below the detection limit of conventional analytical methods, i.e. at least below 0.1 ppm.

Thermoplastic polycarbonate has a wide range of application, particularly in injection molding. In this particular field, howver, it is important to ensure, particularly in the case of transparent formulations, that the molding compositions does not contain any impurities which produce discolorations and molecular weight degradation at the high polycarbonate processing temperatures (280°-350° C.). Iron is one of the impurities which can have particularly unpleasant effects on polycarbonate in this respect. Iron contents in the polycarbonate of more than 0.2 ppm lead to more or less serious yellowing on heating of the polycarbonate to temperatures above 250° C. (cf. for example U.S. Pat. No. 3,943,101, column 1, lines 12 to 31). In addition to yellowing, molecular weight degradation can occur during processing, above all during repeated processing.

Accordingly, it is a considerable advantage that the iron content of the polycarbonate is reduced to a minimum beyond detection by the process according to the invention.

The addition of phosphorous acid as a stabilizer for thermoplastic polycarbonates is known from Japanese OPI specification No. 3596/61.

In addition, it is known from DE-AS 1 469 094 that orthophosphoric acid or triphenyl phosphite may be added to thermoplastic polycarbonates before melting of the polycarbonates to improve their thermal stability (see column 4, lines 7 to 49 of DE-AS 1 469 094). Discoloration and reduction of the average molecular weight are said to be prevented by the addition.

Japanese OPI specification 13 775/62 describes partial esters of phosphorus acid as stabilizers for thermoplastic polycarbonates.

According to US-PS 3 305 520, phosphites are added to the polycarbonates as stabilizers against discoloration.

CH-PS 456 142 mentioned phosphorous acid and triphenyl phosphites as stabilizers for polycarbonates and polyalkylene terephthalates (see column 3, last paragraph and column 4 first paragraph of CH-PS 456 142).

According to US-PS 3 404 122, phosphonic acid is added to the polycarbonates to stabilize them against hydrolytic degradation.

US-PS 3 322 719 describes a process for protecting polycarbonates against the damaging effect of UV rays. In this process, substances which acidify the polycarbonate, such as phosphoric acid for example, are added as additional co-stabilizers before the addition of UV stabilizers of the benzophenone or benzotriazole type.

In all these known cases, however, the phosphorus-containing compounds are added to the polycarbonates. By contrast, the purification process for polycarbonates according to the present invention is characterized in that the phosphorous acid is not incorporated in the polycarbonate, but remains in the aqueous phase during working up of the emulsion. The advantage of this is that the increased hydrolysis lability of the thermoplast produced by residues of phosphorus compounds in the polycarbonate is avoided.

It is known from DE-OS 2 252 757 that the production of polycarbonates by the interfacial process may be carried out in the presence of from 0.01 to 5% by weight of an alkaline earth hypophosphite or alkali hypophosphite, the percentages by weight being based on the weight of the bifunctional phenol used in the reaction. The resulting polycarbonates are color-stable, although it is emphasized that the additive, i.e. the hypophosphite, does not remain in the polycarbonate (page 2, last paragraph of DE-OS 2 252 757).

However, nothing is said in the application of the effective reduction of the Fe content in the polycarbonate. In addition, the process is inefficient by comparison with the process according to the invention in view of the quantity of hypophosphite used (based on the bisphenol).

According to US-PS 3 943 101, the iron content of polycarbonates may be reduced by carrying out synthesis of the polycarbonates by the interfacial process in the present of gluconic acid or an alkali salt thereof. However, this process is not as efficient as the process according to the invention because it involves the use of considerably larger quantities of the complexing agent, based on the bisphenol used. In spite of this, the iron content of the polycarbonate cannot be reduced below 0.1 ppm.

Thermoplastic aromatic polycarbonates in the context of the present invention are known (see for example "H. Schnell, Chemistry and Physics of Polycarbonates", Interscience Publishers, New York, 1964).

They are the reaction products of bisphenols, more especially dihydrodiarylalkanes, with phosgene or diesters of carbonic acid, including—in addition to the unsubstituted dihydroxydiarylethanes—also those of which the aryl radicals bear methyl groups or halogen atoms in the o- and/or m-position to the hydroxyl group. Branched polycarbonates are also included.

The aromatic polycarbonates have average weight average molecular weights $\overline{M}_w$ of from 10,000 to 100,000 and preferably from 15,000 to 40,000, as determined by measurement of the relatively viscosity in $CH_2Cl_2$ at 25° C.

Suitable diphenols are, for example, hydroquinone, resorcinol, 4,4'-dihydroxydiphenyl, bis-(hydroxyphenyl) alkanes, such as for example $C_1$–$C_8$ alkylene and $C_2$–$C_8$ alkylidene bisphenols, bis(hydroxyphenyl)-cycloalkanes, such as for example $C_5$–$C_{15}$ cycloalkylidene bisphenols, bis(hydroxy) sulfides, ethers, ketones, sulfoxides or sulfones; also $\alpha,\alpha'$-bis(hydroxyphenyl) diisopropylbenzene and the corresponding nucleus-alkylated or nucleus-halogenated compounds. Preferred polycarbonates are those based on bis(4-hydroxyphenyl)-2,2-propane (bisphenol A), bis(4-hydroxy-3,5-dichlorophenyl)-2,2-propane(tetrachlorobisphenol A), bis-(4-hydroxy-3,5-dibromophenyl)-2,2-propane(tetrabromobisphenol A), bis-(4-hydroxy-3,5-dimethylphenyl)-2,2-propane(tetramethylbisphenol A), bis-(4-hydroxyphenyl)-1,2-cyclohexane (bisphenol Z), and those based on tri-nuclear bisphenols, such as $\alpha,\alpha'$-bis-(4-hydroxyphenol)-p-diisopropylbenzene. Other bisphenols are described, for example in US-PS 3 028 365 and in US-PS 3 275 601.

Suitable molecular weight regulators are, above all, monofunctional phenols (for example phenol, p-tert.-butyl-phenol, p-iso-octylphenol).

The production of these polycarbonates by the interfacial process has also long been known (cf. for example "H. Schnell, Chemistry and Physics of Polycarbonates" loc. cit.). The procedure adopted is, for example, as follows:

The addition of the phosphorous acid in accordance with the invention is made to the emulsion obtained after condensation to the high molecular weight polycarbonate before the emulsion is separated, purified and worked up.

The thermoplastic polycarbonates may be isolated from the polycarbonate solutions obtained in the usual way, for example by precipitation with iso-octane. The thermoplastic polycarbonates thus obtained are suitable for any of the technical applications for which thermoplastic polycarbonates are normally used.

EXAMPLE 1

30 liters distilled water, 22.8 kg bisphenol A, 1.8 kg sodium hydroxide, 34.5 g phenol and 25 liters methylene chloride are introduced into a glass reaction vessel equipped with a stirrer and reflux condenser. 1.6 kg phosgene are then introduced with vigorous stirring at a pH value kept at 12–13 (by addition of sodium hydroxide). 15 ml triethylamine are then added to the emulsion. After stirring for 20 minutes, 0.12 g $H_3PO_3$ (=0.00053%, based on bisphenol A) are added and, after stirring for another 5 minutes, the emulsion is worked up in the usual way:

1. separation of the aqueous alkaline phase from the $CH_2Cl_2$ phase,
2. washing of the $CH_2Cl_2$ phase first with $H_2O$ and then with 10% phosphoric acid ($H_3PO_4$),
3. washing with water until neutral, followed by separation of the $CH_2Cl_2$ phase,
4. isolation of the polycarbonate by precipitation with iso-octane.

The molecular weight of the polycarbonate $\overline{M}_w$, as measured by gel permeation chromatography, is 29,000. The iron content of the polycarbonate is less than 0.1 ppm, as measured with a Contron ES 750 inductively coupled plasma spectrometer.

COMPARISON EXAMPLE 1

Polycarbonate was prepared in exactly the same way as in Example 1, except for the addition of phosphorous acid (molecular weight of the polycarbonate, as determined by GPC: $\overline{M}_w=29,000$).

Iron content of the polycarbonate (determined as in Example 1): 0.75 ppm.

We claim:

1. In the process for preparing a thermoplastic aromatic polycarbonate resin by the condensation of diphenols in the two phase interfacial process the improvement comprising adding to the aqueous emulsion of the polycarbonate thus produced 2.5 to 100 ppm of phosphorus acid said adding being before said emulsion is separated, said acid remaining in the aqueous phase of said process and said ppm being relative to the weight of diphenols thus condensed.

2. The improvement of claim 1 wherein said phosphorus acid is added in an amount of 5 to 10 ppm.

* * * * *